United States Patent [19]

Törby

[11] 4,277,788

[45] Jul. 7, 1981

[54] DIRECTION DETERMINING APPARATUS RESPONSIVE TO ELECTROMAGNETIC RADIATION

[75] Inventor: Arne Törby, Linköping, Sweden

[73] Assignee: Saab-Scania AB, Linköping, Sweden

[21] Appl. No.: 61,894

[22] Filed: Jul. 30, 1979

Related U.S. Application Data

[63] Continuation-in-part of Ser. No. 954,304, Oct. 24, 1978, abandoned.

[51] Int. Cl.³ .................. G01S 3/48; H01Q 11/10
[52] U.S. Cl. ........................ 343/113 R; 343/16 M
[58] Field of Search .................. 343/16 M, 113 R

[56] References Cited

U.S. PATENT DOCUMENTS

| | | | |
|---|---|---|---|
| 3,064,253 | 11/1962 | Kirkpatrick | 343/16 M |
| 3,670,332 | 6/1972 | Blommendaal | 343/16 M X |
| 3,772,695 | 11/1973 | Hoffman | 343/16 M X |
| 4,136,342 | 1/1979 | Alcock et al. | 343/113 R |

*Primary Examiner*—T. H. Tubbesing
*Attorney, Agent, or Firm*—James E. Nilles; James R. Custin

[57] ABSTRACT

An antenna array for directional determination comprises two pairs of elongated end-firing log-periodic antenna elements, each pair fixed symmetrically to a reference plane and preferably forwardly convergent to it. The two antenna elements of one pair converge forwardly at an angle b, those of the other pair converge at a preferred angle $a = 1.5 \, b$. In one embodiment each pair is connected with a 90°—hybrid, and from the detected and amplified signals across individual elements of each pair there is obtained a difference signal designated $L_1$ for the b-angle pair, $L_2$ for the a-angle pair. A third difference signal $L_3$ is obtained from $L_2-L_1$. The magnitude of each difference signal depends upon value of an angle V between a symmetry line in the plane of symmetry, symmetrical to the antenna elements, and the projection in that plane of a line through the array and a detected radiation source. An indication of V is taken on the basis of $L_1$ if $L_1$, $L_2$ and $L_3$ are on the same side of zero. A more precise indication of V is then taken on the basis of $L_2$ by comparing absolute value of $L_2$ with the absolute value of an adjustably variable reference signal. Other signal processing arrangements are disclosed that produce the same effective lobe sharpening.

11 Claims, 10 Drawing Figures

DIRECTION DETERMINING APPARATUS RESPONSIVE TO ELECTROMAGNETIC RADIATION

RELATED APPLICATION

This application is a continuation-in-part of my allowed application Ser. No. 954,304, filed Oct. 24, 1978, now abandoned.

FIELD OF THE INVENTION

This invention relates to apparatus for determining the directional relationship between receiving apparatus which is responsive to electromagnetic radiations such as radar pulses and a transmitter from which such radiations emanate; and the invention is more particularly concerned with receiving apparatus that comprises an array of end-firing log-periodic antenna elements which together define a reference plane and a sighting line contained in that reference plane, and means for so processing electromagnetic radiation signals received by the array that an unambiguous and precise indication can be obtained of the angular relationship between said sighting line and the projections upon said plane of a line connecting the array with a source from which radiation signals emanate.

BACKGROUND OF THE INVENTION

When a pulsed electromagnetic radiation, such as that of a monopulse radar, is intercepted by either of a pair of antenna elements, the absolute phase and amplitude of the intercepted signal can vary in dependence upon factors which influence both the transmitter and the radiation as it passes from the transmitter to the receiver. However, the signals which the intercepted radiation produces at the two antenna elements of the pair have a relationship of phase and amplitude that is dependent only upon the angle from which the radiation arrives at the antenna elements; hence the direction to the source of the radiation can be determined on the basis of the relationship between signals at the antenna elements.

With prior receivers comprising an array of antenna elements, it has not been possible to obtain a single unambiguous value for the interception angle, but instead indications were obtained that signified numerous equally probable angle values within the response lobe of the array. Since the response lobe should be relatively broad, in order to cover as large a zone as possible, apparatus producing such ambiguous results was unsuitable for determining direction to a radiation transmitter.

In order to obtain a very precise determination of the direction from an antenna array to a transmitter that emits radiation intercepted by the array, the response lobe or sensitivity lobe of the antenna array should be relatively narrow. In efforts to improve the precision of directional determinations, various expedients have therefore been proposed for narrowing the sensitivity lobe of an antenna array. One such proposal was to employ a geometrically large antenna array. Another was to provide additional antenna elements for suppressing the side lobes of the antenna array, but this had no influence upon the breadth of the main lobe and therefore afforded little benefit with respect to attainment of the desired precision. In any case, an antenna array having a sharp and narrow zone of sensitivity is inappropriate to equipment for ascertaining direction to a radiation source for the reason, among others, that at any given instant such an array can respond only to transmissions emanating from within the small sensitivity lobe, and therefore signals from a source outside that lobe could not be received and might go undetected.

What was desired but could not heretofore be obtained in a practical form was an antenna array which had a broad response lobe for search and acquisition of signal sources to be localized, but which could be more or less instantaneously altered or modified to have a sharp, narrow sensitivity lobe for precise localization of a radiation source once its general direction had been ascertained. Of course such quick alteration of the construction of an antenna array is not a realistic possibility; but even if it could be achieved, it would still leave unsolved the problem of ambiguities in the signals obtained from it.

SUMMARY OF THE INVENTION

A general object of this invention is to provide apparatus that comprises an antenna array which is capable of receiving signals from within a relatively broad sensitivity lobe, and signal processing apparatus cooperating with that antenna array to provide unambiguous directional determinations on the basis of radiation signals intercepted by the array, and whereby the practical equivalent of lobe sharpening can be produced without any alteration of the antenna array itself, so that once determination has been made of the general direction to a radiation source within the broad sensitivity lobe of the antenna array a precise determination of the direction to that source can be made very quickly and easily.

Thus it is another general object of the invention to provide apparatus comprising an antenna array and cooperating signal processing equipment, which apparatus is capable of processing signals derived from electromagnetic radiation intercepted by the antenna array in such a manner as to produce an unambiguous determination of a directional relationship between the antenna array and the source of the radiation.

It is also a general object of the invention to provide apparatus of the character described that is capable of being operated in either of two selectable modes, one of which modes provides for utilization of a broad lobe of antenna array sensitivity and the other of which provides for an effective sharpening of the lobe of sensitivity, for precise determination of direction, said apparatus being arranged to provide for substantially instantaneous shift from one to the other of said modes.

It is also an object of the invention to provide apparatus of the character described that comprises an antenna array having antenna elements that are in a fixed relationship to one another and having signal processing means whereby signals received by the antenna array can be so processed as to produce the effect of a desired sharpening or broadening of the sensitivity lobe of the antenna array.

In general, the objects of the invention are achieved with receiving apparatus responsive to electromagnetic radiation such as radar pulses, comprising an array of elongated end-firing log-periodic antenna elements defining a reference plane containing a sighting line, and signal processing apparatus connected with said array and comprising readout means by which signals produced at the array by radiation emanating from a source that is forwardly remote from the array are processed to provide at said readout means an indication of a directional angle between said sighting line and the projection upon said reference plane of a line through said array and said source.

A characterizing feature of the receiving apparatus of this invention is that the antenna array comprises two pairs of antenna elements, said pairs of antenna elements being disposed at opposite sides of the reference plane in a substantially symmetrical relation thereto, with the two antenna elements of each pair being forwardly convergent relative to one another. Preferably the two antenna elements of one pair are convergent at a lesser convergence angle than the two antenna elemens of the other pair, and it is preferred that the elements of each pair be in symmetrical relationship to the sighting live.

The signal processing apparatus that cooperates with this array is characterized by first directional angle output producing means connected with two of the antenna elements for producing, in response to radiation that is intercepted by said two antenna elements, a first directional angle output having a magnitude which signifies any of one set of directional angles, of which only one corresponds to the true directional angle to the source of the intercepted radiation; second directional angle output producing means connected with the other two of said antenna elements for producing, in response to said radiation, a second directional angle output having a magnitude which signifies any of a second set of directional angles, of which only one corresponds to said true directional angle; and third output producing means connected with said first and second directional angle output producing means for producing a third output having a magnitude corresponding to a function of a comparison relationship between said first and said second directional angle outputs, which comparison relationship can be either a sum or a difference relationship. Connected with said first, said second and said third output producing means is comparison means which comprises gating means and is arranged to pass one of said directional angle outputs to the indicating means upon the condition that there is a predetermined relationship between said third output and at least the other of said directional angle outputs.

In a preferred embodiment of the invention the comparison means comprises three comparison devices, one for each output producing means, and the signal processing apparatus further comprises an adjustable reference signal generator connected with said comparison means, for producing a reference signal which can have predetermined magnitude and which can be adjusted to other magnitudes. A second gating means is connected with said reference signal generator, with each of said comparison devices and with the directional angle output producing means that produces the other of said directional angle outputs, said second gating means being arranged to pass only said other directional angle output to said indicating means when the magnitude of the reference value signal is other than said predetermined magnitude and has an absolute value greater than that of said other directional angle output.

BRIEF DESCRIPTION OF THE DRAWINGS

The accompanying drawings illustrate embodiments of the invention constructed according to what are now regarded as the best modes for the practical application of the principles thereof, and in which.

DETAILED DESCRIPTION OF THE INVENTION

Figure 3:
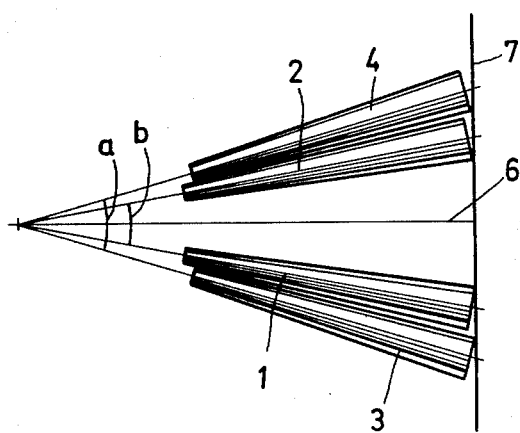
FIG. 3 is a plan view of the antenna array shown in FIG. 1.

Referring now to the accompanying drawings, an antenna array embodying the principles of this invention comprises end-firing log-periodic antenna elements 1, 2, 3 and 4, which are illustrated as being of the conical spiral type that taper forwardly. The several antenna elements are fixed in their relationship to one another and they are arranged in pairs, the elements 1 and 2 comprising one pair and the elements 3 and 4 comprising a second pair. The two antenna elements of each pair are forwardly convergent relative to one another, as best seen in FIG. 3. The purpose of such convergence is to render each pair of antenna elements frequency-independent in a known manner, such frequency independence resulting from the distance between the phase centers of the elements being constant in relation to wavelength of intercepted radiation.

For simplicity in signal processing, the two antenna elements 1, 2 and 3, 4 of each pair are preferably arranged symmetrically relative to those of the other pair, in that the elements of both pairs are symmetrical to a single plane that contains a symmetry line 6. Between the two pairs of elements there is a reference plane 5 which is normal to the single plane just mentioned and to which the two pairs are symmetrical. Although the planes 8 and 9 that contain the axes of each pair of elements are preferably forwardly convergent towards the reference plane 5, as shown, those planes can be parallel to the reference plane or even forwardly divergent from it. With the elements in the preferred symmetrical relationship described above, the symmetry line 6 lies in the reference plane 5 and is of course equidistant from the two elements of each pair. The antenna elements 1–4 are fixed in their relationship to the reference plane 5 and to another plane 7 that is normal to the reference plane and to the symmetry line 6.

In one embodiment of the invention, as explained hereinafter, the angle of convergence b between the two antenna elements 1, 2 of one pair can be equal to the angle of convergence a between the two elements 3, 4 of the other pair; but in most embodiments the angle of convergence a is larger than the angle of convergence b, and the difference between these angles of convergence is such that the angle a is less than twice the angle b and is preferably 1.5 times the angle b. That particular difference between the angles of convergence has been empirically found to be optimal for side lobe suppression.

In the preferred arrangement of the antenna array, the bisectors 10 and 11 of the respective angles of convergence a and b intersect the symmetry line 6 at a point 12, and the planes 8 and 9 that contain the antenna element axes of the respective pairs 1, 2 and 3, 4 cut the reference plane 5 along a line 13 which is approximately at right angles to the symmetry line 6 and which of course passes through the point 12. As a result of the preferred relationships, the two pairs of antenna elements 1, 2 and 3, 4 are both aimed in the same direction and are so arranged that the points at which the several antenna elements cut the plane 7 lie at the corners of a regular trapezoid; hence, there is complete symmetry of the antenna array which facilitates the subsequent signal processing.

Figure 1:
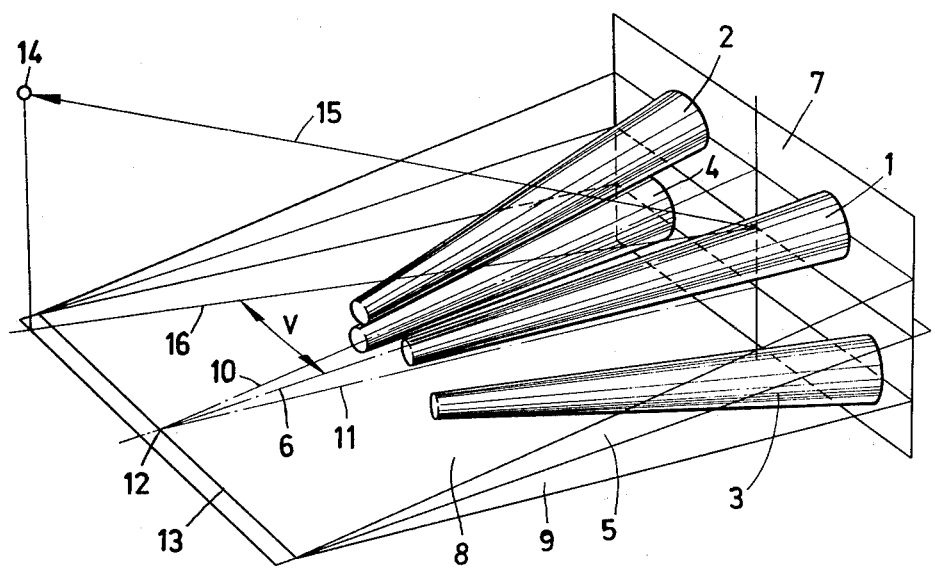
FIG. 1 is a perspective view illustrating the arrangement of antenna elements in an antenna array embodying the principles of the present invention.

In FIG. 1, the location of a transmitter is designated by 14, and it is assumed that electromagnetic radiations from it, which can be radar pulses or the like, are intercepted by the antenna array. The line of sight 15 between the transmitter 14 and the antenna array has a projection 16 upon the reference plane 5 that defines a directional angle V with the symmetry line 6, and the function of the apparatus is to provide an unambiguous and precise determination of the value of the angle V, which value is of course needed for determining the location of the transmitter 14.

It will be apparent at this point that an antenna array embodying the principles of the invention can comprise antenna elements of other types than the conical spiral type illustrated, and could be, for example, a so-called dipole array having its E-plane oriented relative to the planes 8 and 9 in accordance with the polarization of the radiation to be intercepted.

Figure 4:
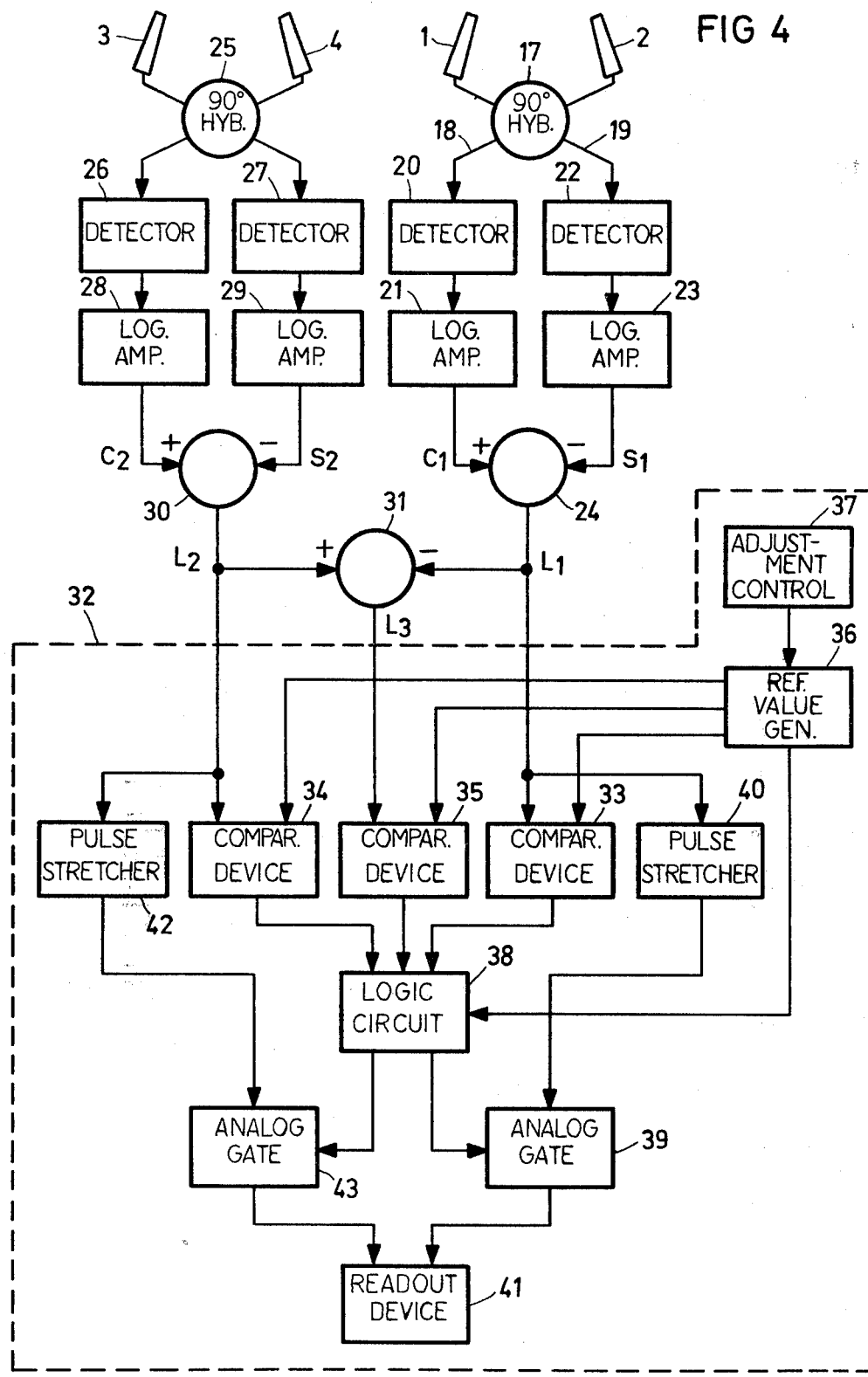
FIG. 4 is a block diagram of signal processing apparatus comprising a receiver that embodies the principles of this invention, which a symmetrical signal processing arrangement.

FIG. 4 illustrates the construction of a receiver for cooperation with antenna elements 1, 2, 3, 4 arranged in an array as described above. The pair of antenna elements 1, 2 are connected to a 90°—hydrid 17 having a pair of output leads 18, 19. A detector 20 and a logarithmic amplifier 21, in series, are connected to the hybrid output lead 18, and, similarly, a series-connected detector 22 and logarithmic amplifier 23 are connected to the hybrid output lead 19.

The function of the 90°—hybrid 17 is to convert the phase difference between signals at antenna elements 1 and 2 into a corresponding difference in amplitude between the output signals of the hybrid in output leads 18 and 19. By means of the detector 20 and the logarithmic amplifier 21 there is obtained a signal $C_1$ which, in a well known manner, varies with the angle in the reference plane 5 at which the received radiation intersects one of the antenna elements 1 or 2.

In an analogous manner, a signal $S_1$ is developed by means of the detector 22 and the logarithmic amplifier 23 from the signal at the output lead 19 of the hybrid 17, and said signal $S_1$ varies with the angle at which the received radiation intersects the other member of the pair of antenna elements 1, 2. Coupled to the output of each of the logarithmic amplifiers 21 and 23 is a difference former 24 which produces a difference signal $L_1$ that corresponds to $C_1$ minus $S_1$. The magnitude of the difference signal $L_1$ is dependent upon the directional angle V between the symmetry line 6 and the projection 16 upon the reference plane of the straight line 15 through the antenna array and the transmitter 14, and is also a function of the angle of convergence b between antenna elements 1 and 2, but is independent of the strength of the received electromagnetic radiations.

In an arrangement similar to that for the antenna elements 1, 2, the antenna element pair 3, 4 is connected with another 90°—hybrid 25 that has one output lead connected with a detector 26 and a logarithmic amplifier 28, in series, and has its other output lead likewise in a series connection with a detector 27 and a logarithmic amplifier 29. The output of the logarithmic amplifier 28, which is a signal $C_2$, and the output of the logarithmic amplifier 29, which is a signal $S_2$, are applied to the respective input terminals of a difference former 30, the output of which is a signal $L_2$ that corresponds to $C_2$ minus $S_2$. The signal $L_2$ has a magnitude which depends upon the prevailing value of the directional angle V but which is also a function of the angle of convergence a between antenna elements 3 and 4.

Figure 6:
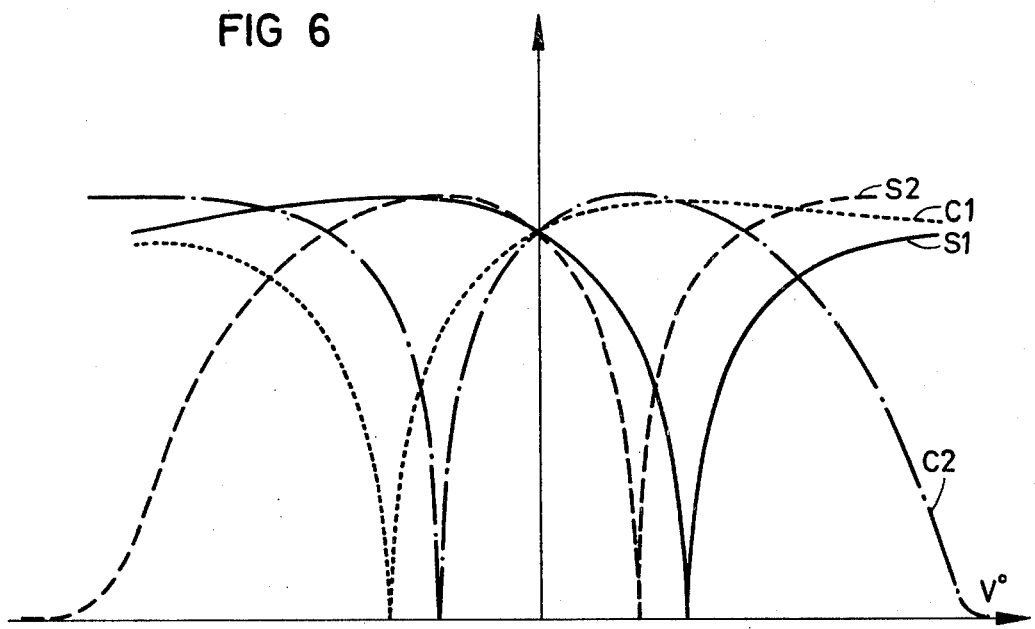
FIGS. 6 and 7 are graphs representing the amplitude of signals at certain points in the apparatus illustrated in FIGS. 4 and 5, as a function of the angle at which radiation is intercepted by the antenna array shown in FIGS. 1–3.

FIG. 6 shows how the respective signals $C_1$, $S_1$, and $C_2$ and $S_2$ vary in magnitude as a function of the directional angle V. It will be observed that with the preferred symmetrical arrangement of antenna elements, signals $C_1$ and $S_1$ are mirror images of one another relative to the axis that corresponds to the symmetry line 6, and signals $C_2$ and $S_2$ are likewise mirror images of one another relative to that axis. Hence, full symmetry exists as to the output of each antenna element pair.

By means of a difference former 31 that has its inputs respectively connected to the outputs of difference formers 24 and 30 there is produced a third difference signal $L_3$ that is equal to $L_2$ minus $L_1$.

Figure 7:
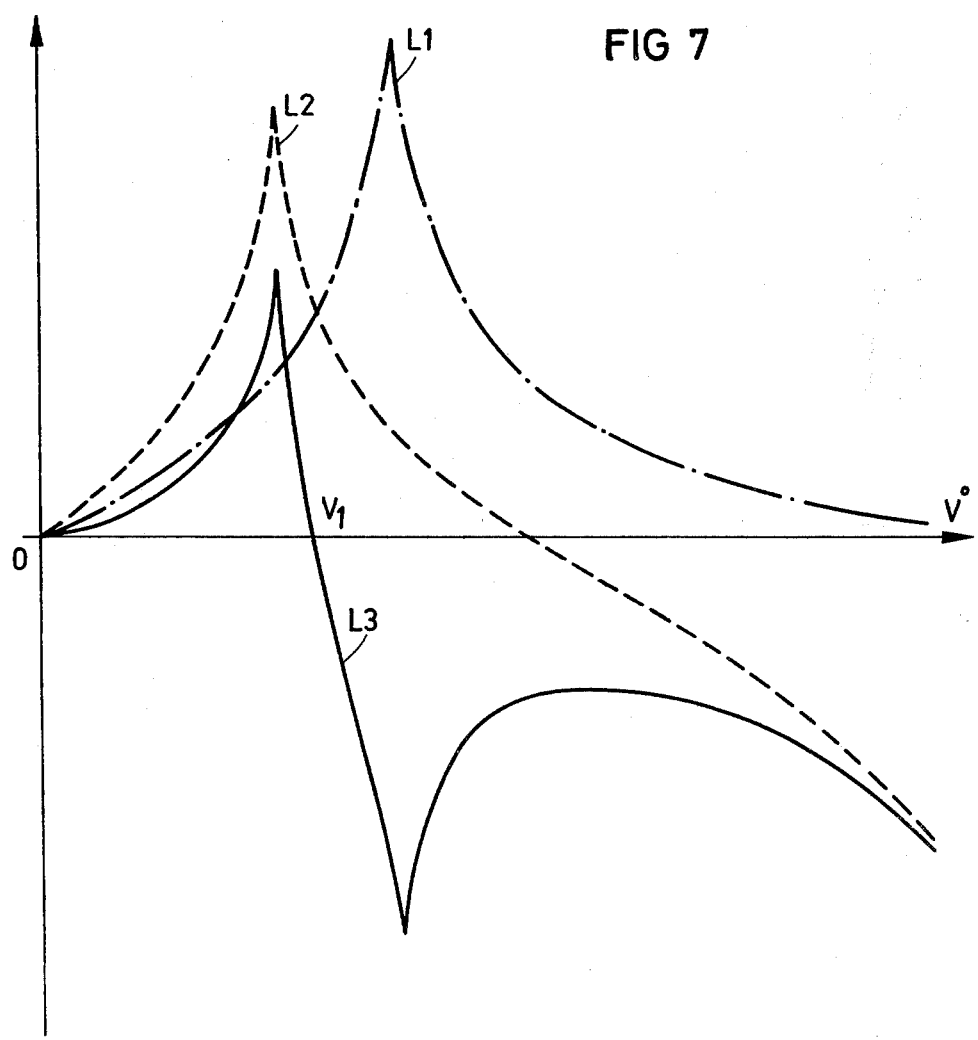

FIG. 7 illustrates the magnitude of each of the difference signals $L_1$, $L_2$, $L_3$ as a function of the directional angle V, through only those values of V that are positive. Positive values of V are of course those taken at one arbitrarily chosen side of the symmetry line 6, while negative values are those at the other side of that line. For negative values of V, the signals $L_1$, $L_2$ and $L_3$ will be symmetrical to the respective illustrated positive values with respect to the horizontal axis. It will be observed that, as with the difference signals $L_1$ and $L_2$, the magnitude of difference signal $L_3$ is dependent upon the value of the angle V; but the pattern of variation of $L_3$ with V is different from that of $L_1$ and $L_2$. And while the curves for variation of $L_1$ and $L_2$ with V are generally similar in character, they differ substantially with respect to specific values. It will be seen from FIG. 7 that almost any arbitrarily chosen positive magnitude for either $L_1$ or $L_2$ corresponds to two substantially different values of V, inasmuch as almost every line drawn parallel to and above the axis 0-V° will intersect each of the $L_1$ and $L_2$ curves at two points.

To obtain an unambiguous indication of the value of the angle V from a given set of $L_1$, $L_2$ and $L_3$ difference signals, the receiver of this invention has signal processing means, designated generally by 32, comprising a reference value generator 36 and comparison means comprising three comparison devices 33, 34, 35, a logic circuit 38 connected with the comparison means, and a pair of gates 39, 43, each connected with the logic circuit and arranged, under certain conditions, to pass one or the other of the difference signals $L_1$ or $L_2$ to a readout device 41.

Each of the three comparison devices 33, 34, 35 has two input terminals, one of which is connected with the output terminal of the reference value generator 36. Comparison device 33 has its other input connected with the output of the difference former 24 to receive the signal $L_1$. In like manner the other input terminal of comparison device 34 is connected with the output of difference former 30 to receive the signal $L_2$, and the other input terminal of comparison device 35 is connected with the output of difference former 31 to receive the signal $L_3$. The magnitude of the reference value output of the reference value generator 36 is adjustable by means of a manually or automatically adjustable setting device 37. Thus, in the comparison devices 33, 34, 35 the respective signals $L_1$, $L_2$ and $L_3$ are compared with the reference value that is being fed out of the reference value generator 36 in accordance with the setting to which it is adjusted. The reference value can be set equal to zero in order to obtain full symmetry.

From FIG. 7 it will be seen that an unambiguous indication of the value of the directional angle V can be based upon the magnitude of the difference signal $L_1$ through that portion of the curve of $L_1$, plotted for positive values of V, in which the magnitude of $L_1$ is less than that of $L_2$, i.e., through the range of positive values of V for which $L_3$ is positive. In like manner, if the $L_1$ signal has a negative magnitude, an unambiguous evaluation of V can be obtained from it through the range of negative values of V for which $L_3$ is negative.

It will be apparent that a mere comparison of the magnitude of the $L_1$ difference signal with the $L_2$ difference signal will not resolve ambiguities of sign with respect to the value of the angle V. However, it is evident from FIG. 7 that within the restricted range of positive angles of V from zero to $V_1$, all three difference signals $L_1$, $L_2$ and $L_3$ have positive values; and, obviously, all three have negative values within the corresponding range of negative values of V. In effect, the apparatus of the invention accepts an $L_1$ difference signal for the purpose of determining the angle V only on the condition that such signal corresponds to a value of V that is within the restricted 0 to $V_1$ range; and in so doing the apparatus produces the practical effect of substantial lobe sharpening and side lobe suppression without in fact narrowing the sensitivity lobe of the antenna array. And the requirement for an $L_1$ signal to signify a value of V within the range just mentioned is that the magnitudes of its accompanying $L_2$ and $L_3$ signals shall be on the same side of the zero signal magnitude line as the magnitude of that $L_1$ signal.

The comparison means 33, 34, 35, in cooperation with the reference value generator 36, tests the difference signals $L_1$, $L_2$ and $L_3$ for fulfillment of this condition, and, if the condition is fulfilled, causes the gating means comprising the logic circuit 38 and the gate 39 to pass the $L_1$ signal to the indicating or readout device 41. For the purposes of such testing, each of the comparison devices 33, 34, 35 issues a binary output that corresponds either to a "one" or to a "zero", depending upon whether the difference signal $L_1$, $L_2$ or $L_3$ fed to that comparison device has a magnitude which is greater than or less than that of the reference value signal which is also fed to that device. Typically, for making a determination of the directional angle V on the basis of a received $L_1$ signal, the reference value generator 36 is so adjusted by means of the control element 37 that its output signal has a value which corresponds to zero magnitude of the difference signals. In that case, if the $L_1$ difference signal has a positive magnitude, and corresponds to a value of angle V that is within the 0 to $V_1$ range, the output of each of the comparison devices will be of one kind, e.g., a "one". If the magnitude of the $L_1$ difference signal is negative and corresponds to a value of V within the negative counterpart of the 0 to $V_1$ range, then the output of every comparison device will be of an opposite kind, e.g., a "zero". If the value of V that is signified by the prevailing $L_1$, $L_2$ and $L_3$ signals is outside the 0 to $V_1$ range, then the output of one of the comparison devices 33, 34, 35 will differ in kind from the outputs of the other two.

The logic circuit 38 is so arranged in cooperation with the analog gate 39 that said gate is opened if—but only if—three outputs of like kind are issued to the logic circuit from the comparison means 33, 34, 35. With analog gate 39 opened, the $L_1$ signal can pass through it from the difference former 24 to the readout device 41, to provide at the readout device an unambiguous indication of the prevailing value of the angle V.

In the case of radar pulse radiations, which reach the antenna array 1-4 in very short pulses, the signals from the difference former 24, if passed directly to the readout device 41, would be of such short duration that a satisfactory readout might not be obtained, and there would also be a possibility that such a brief signal would not pass the analog gate 39 during the time in which it was open. The $L_1$ difference signal is therefore fed from the difference former 24 to the gate 39 through a pulse stretcher 40.

As is evident from FIG. 7, the variation in magnitude of $L_1$ for a given change in the value of V is relatively small, which is to say that because of the breadth of the angular zone denoted by $L_1$ through the 0 to $V_1$ range of angles, angle value readings taken on the basis of the $L_1$ signal may not have the precision needed for many purposes. But once an approximate value of the angle V has been obtained on the basis of the $L_1$ difference signal, a more precise reading can be obtained on the basis of the $L_2$ signal, which has a steeper rise—i.e., has a greater change in magnitude for a given change in the value of V. However, such more precise readouts are given only within a smaller range of values of V, and taking readings on the basis of the $L_2$ signal is thus equivalent to further lobe sharpening.

In order to permit the $L_2$ difference signal to be employed for such more precise readouts, the reference value generator 36 is so adjusted by means of its control element 37 that its reference value signal has a magnitude of other than zero. If the value of V has been found to be within the positive 0-$V_1$ range, the reference value signal is adjusted upwardly through positive magnitudes; if the angle V is negative, the reference value signal is adjusted downwardly through negative magnitudes. The purpose of this adjustment is to make a new comparison, this time between the absolute value of the $L_2$ difference signal and the absolute value of the reference value signal, for taking only those angle values of the $L_2$ signal that are of less than the predetermined magnitude signified by the reference value signal. To this end a comparison is made at the comparison device 34, which issues an output (e.g., a binary "one" output) to the logic circuit 38 if and when the absolute magnitude value of the reference signal exceeds the absolute value of the prevailing $L_2$ signal. The logic circuit 38 also has a connection with the reference value generator 36 whereby it is caused to issue a gating output to the second analog gate 43 upon the two-fold condition that the reference value signal from the generator 36 corresponds to a value other than zero and that an output is received from the comparison device 34. The $L_2$ signal is fed from the difference former 30 to the second gate 43 through another pulse stretcher 42 and is indicated on the readout device 41 as explained above. Of course no $L_1$ signal passes the first analogue gate 39 when the reference value signal has other than a zero value.

Inasmuch as both positive and negative reference values can be produced by the generator 36, and the comparison device 34 responds to a difference in absolute values as between the reference value signal and the $L_2$ signal, the effective lobe sharpening obtained by means of the signal processing apparatus is symmetrical for positive and negative values of the angle V.

Figure 2:
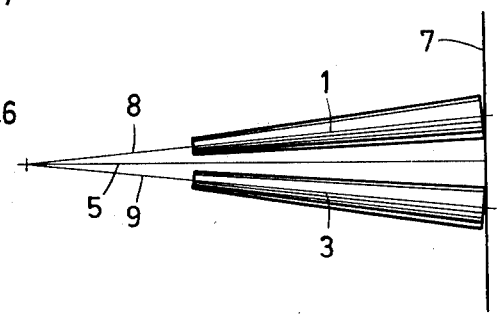
FIG. 2 is a side view of the antenna array shown in FIG. 1.
Figure 5:
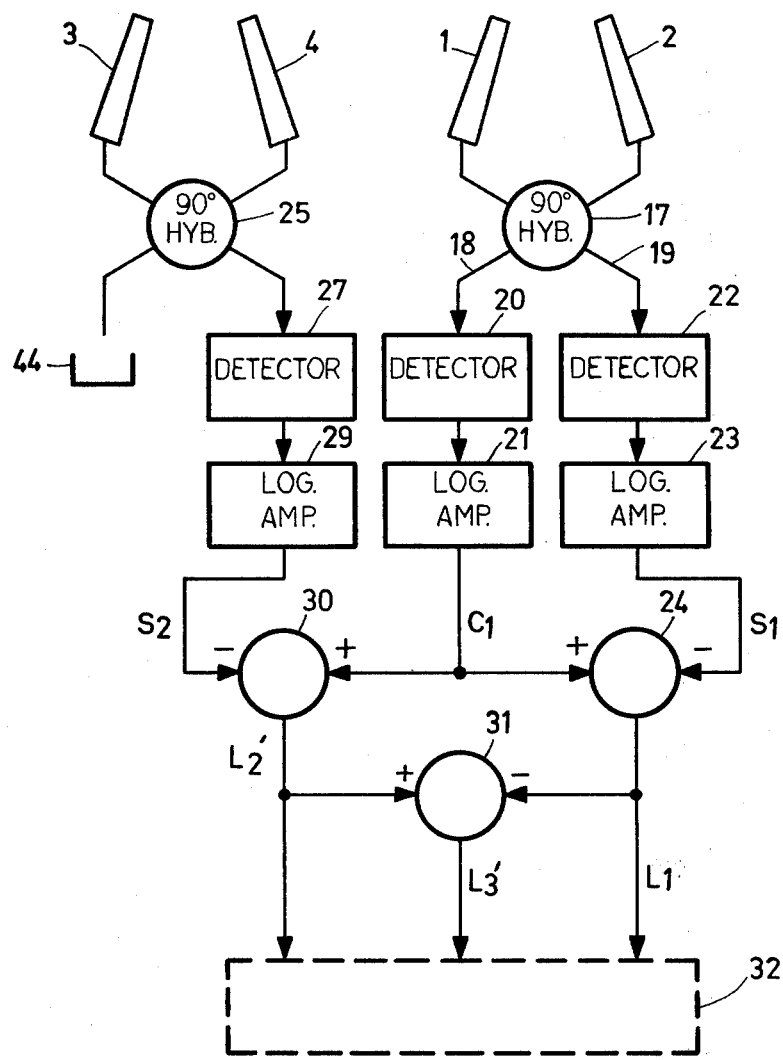
FIG. 5 is a block diagram of a modified and somewhat simplified embodiment of apparatus generally like that illustrated in FIG. 4.

FIG. 5 illustrates a modified and somewhat simplified form of the signal processing apparatus by which unambiguous indications of the value of the directional angle V can be obtained with an antenna array like that illustrated in FIGS. 1-3, but with somewhat simplified signal processing apparatus. In FIG. 5, elements having the same functions as those shown in FIG. 4 are designated by the same reference numerals as used in FIG. 4.

In the apparatus shown in FIG. 5, the 90°—hybrid 17 is connected with the antenna elements 1 and 2 and with detectors 20 and 22 as in the FIG. 4 embodiment. However, the 90°—hybrid 25 that is connected with antenna elements 3 and 4 is so arranged that no signal corresponding to the signal $C_2$ is fed to the difference former 30, but, instead one of the output leads of the hybrid 25 is connected with a terminal 44 which is arranged to absorb the signal in that lead without reflecting any signal back to the hybrid 25. The other output lead of the hybrid 25 is connected with the detector 27 and logarithmic amplifier 29, in series, all as in FIG. 4, and thus an $S_2$ signal is fed to the difference former 30. In this case, however, that $S_2$ signal is subtracted at the device 30 from the $C_1$ signal obtained from the 90°—hybrid 17. The difference signal $L_2'$ that issues from the difference former 30 has a magnitude which depends upon the angle V and which is also a function of the angle of convergence a between antenna elements 3 and 4, although its magnitude is also, to some extent, a function of the angle of convergence b between antenna elements 1 and 2. The $L_2'$ difference signal is fed to the difference former 31 and is compared there with the $L_1$ difference signal issuing from the difference former 24 to produce a third difference signal $L_3'$. It will be apparent that the difference signals $L_2'$ and $L_3'$ will be somewhat asymmetrical, but compensation can be made for this lack of symmetry by controlling the reference value signal from the generator 36 so that it has values appropriately different from those employed with the apparatus shown in FIG. 4. Such control is of course accomplished by adjustment of the control element 37. Indications of the value of V, based upon prevailing values of $L_1$ and $L_2'$, are then obtained in substantially the same manner as with the apparatus shown in FIG. 4.

Figure 8:
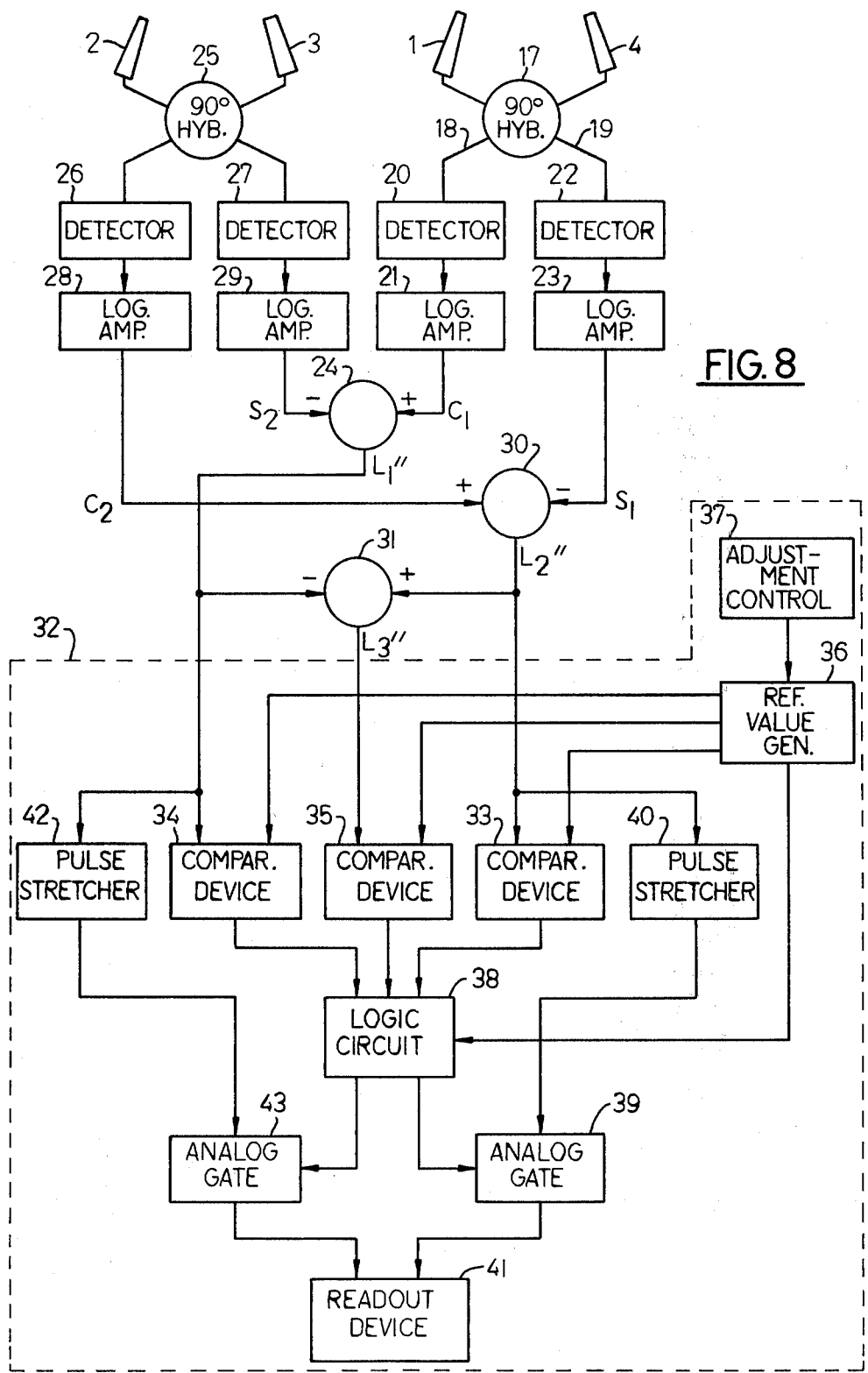
FIGS. 8 and 9 are block diagrams of further modified embodiments of the invention.

In the embodiment of the invention illustrated in FIG. 8, the antenna elements are connected to the 90°—hybrids 17 and 25 in diagonnally opposite pairs, so that antenna elements 1 and 4 are connected to the 90°—hybrid 17 and elements 2 and 3 are connected to the 90°—hybrid 25. Again, each of the outputs of each 90°—hybrid is connected with a detector and a logarithmic amplifier, in series, in an arrangement generally like that of FIG. 4. In this case, however, the difference former 24 receives the $S_2$ signal from the 90°—hybrid 25 and the $C_1$ signal from the 90°—hybrid 17, while the difference former 30 receives the $S_1$ signal from the 90°—hybrid 17 and the $C_2$ signal from the 90°—hybrid 25. The output of the difference former 24 is therefore a signal $L_1''$ that corresponds to $C_1$ minus $S_2$, and the output of difference former 30 is a signal $L_2''$ that corresponds to $C_2$ minus $S_1$. The difference former 31 receives the $L_1''$ and $L_2''$ signals as inputs, and its output is a signal $L_3''$ that corresponds to $L_2''$ minus $L_1''$. Since the $L_1''$ and $L_2''$ signals originate from symmetrically arranged antenna element pairs, the signals $L_1''$, $L_2''$ and $L_3''$ can be fed to signal processing means 32 exactly like that shown in FIG. 4, having $L_1''$, $L_2''$ and $L_3''$ inputs corresponding to the $L_1$, $L_2$ and $L_3$ inputs, respectively, of FIG. 4.

Figure 9:
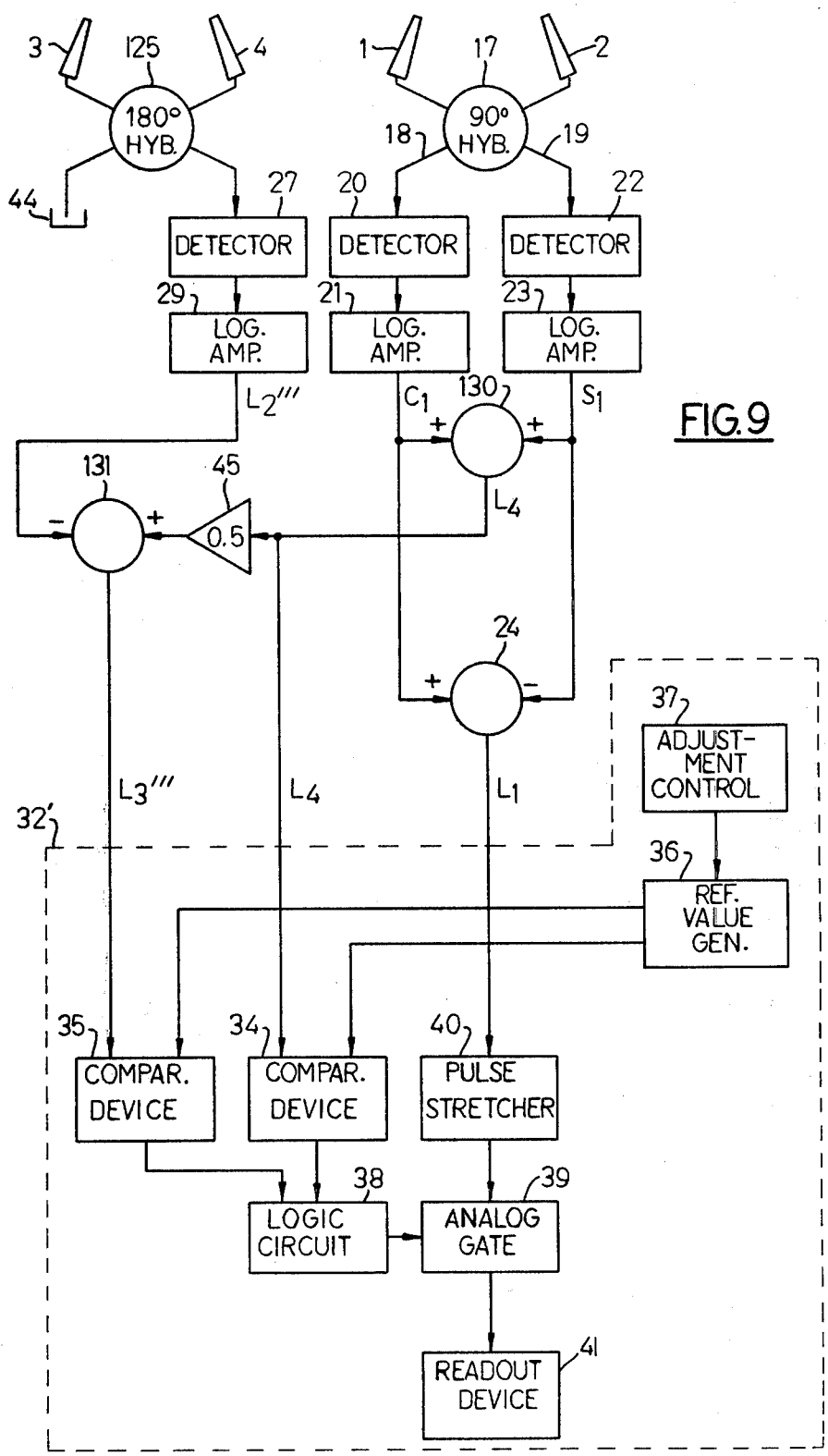

The embodiment of the invention illustrated in FIG. 9 is the one in which the angle of convergence a between antenna elements 3 and 4 is preferably equal to the angle of convergence b between elements 1 and 2. In this case the element pair 1, 2 is connected with a 90°—hybrid 17, as in FIG. 4, and each of the outputs 18, 19 of that 90°—hybrid is again connected with a detector and a logarithmic amplifier, in series. However, the connections of the antenna elements 3, 4 comprise a 180°—hybrid 125, i.e., those elements are connected to a 90°—hybrid but one of the conical spiral antenna elements 3, 4, is rotated 90° about its axis relative to the other. In analogy to the FIG. 5 arrangement, one of the output leads of the 180°—hybrid 125 is connected with a terminal 44 which is arranged to absorb the signal in the lead without reflecting any signal back to the hybrid. The other output lead 27 of the 180°—hybrid 125 is again connected with a detector and a logarithmic amplifier, in series. The outputs $C_1$ and $S_1$ from the antenna element pair 1, 2 are again fed to a difference former 24 to produce a signal $L_1$ that corresponds to $C_1$ minus $S_1$, but those same outputs are also fed to a summer 130 which produces an output $L_4$ that corresponds to $C_1$ plus $S_1$. The $L_4$ output is fed to an attenuator 45 and also to signal processing means 32'. The output of the attenuator 45, which constitutes one input to a difference former 131, has a magnitude equal to one-half that of the $L_4$ signal. The other input to the difference former 131 is an $L_2'''$ signal that originates from the 180°—hybrid 125. The output of the difference former 131 is an $L_3'''$ signal that corresponds to $\frac{1}{2}L_4$ minus $L_2'''$.

In the FIG. 9 embodiment the signal processing means 32' is somewhat simplified as compared to the corresponding portion of the FIG. 4 apparatus. The $L_3'''$ and $L_4$ signals are fed to comparison devices 35 and 34, respectively, each of which also receives an output from a reference value generator 36. The outputs of the two comparison devices are fed to a logic circuit 38 which controls an analogue gate 39. The $L_1$ signal is fed only to a pulse stretcher 40 which feeds into the analog gate 39.

Figure 10:
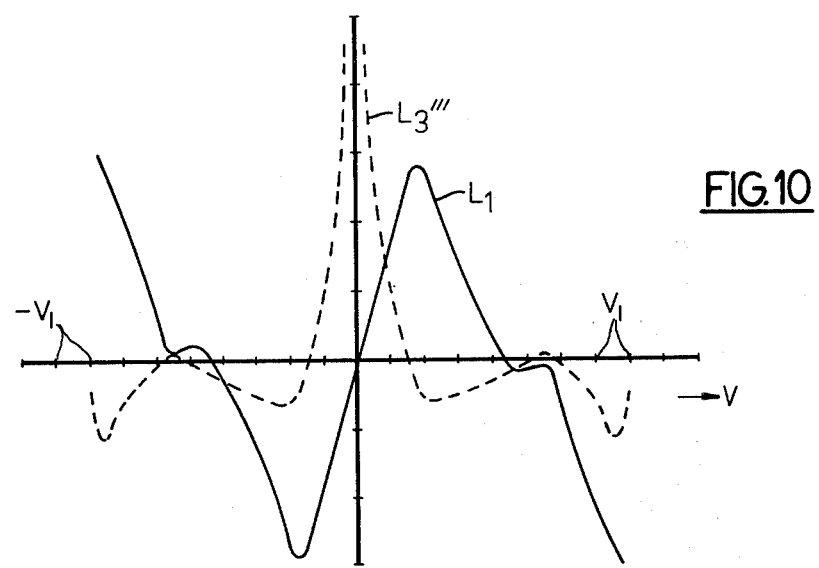
FIG. 10 is a graph representing the relative amplitudes of the $L_2$ and $L_3'''$ signals in the apparatus of FIG. 9.

In the embodiment of the invention according to FIG. 9, angle indications are produced only for those values of the signal $L_1$ that are smaller than the respective values of both $L_3'''$ and $L_4$. As a result, the value of the angle V can be unambiguously ascertained, with side lobe suppression, through a range between selectable values $-V_1$ and $V_1$ in FIG. 10. Particular values of $-V_1$ and $V_1$ are selected by controlling the value of the reference signal with the adjusting instrumentality 37 for the reference signal generator 36. It will be evident from FIG. 10 that the maximum range of values of V that can be indicated is obtained with a zero—value reference signal, and that increasing the magnitude of the reference signals through positive values has the effect of lobe sharpening, since angle indications will be given for only those portions of the $L_1$ signal that lie between the abscissas on the legs of the $L_3'''$ curve that are cut by the reference signal value.

From the foregoing description taken with the accompanying drawings, it will be apparent that apparatus of this invention is responsive to electromagnetic radiation such as radar pulses to provide an unambiguous indication of direction to a source from which the radiation emanates, and that the apparatus of this invention comprises an antenna array having antenna elements that are in fixed relation to one another and signal processing means connected with the antenna elements whereby the effect of selective lobe sharpening can be obtained.

Those skilled in the art will appreciate that the invention can be embodied in forms other than as herein disclosed for purposes of illustration.

I claim:

1. Receiving apparatus responsive to electromagnetic radiations such as radar pulses, comprising an array of elongated end-firing log-periodic antenna elements defining a reference plane containing a sighting line, and signal processing apparatus connected with said array and comprising angle value indicating means, by which signals produced at the array by radiation emanating from a source that is forwardly remote from the array are processed to provide at said indicating means an indication of a directional angle between said sighting line and the projection upon said reference plane of a line through said array and said source, said receiving apparatus being characterized by:
A. said antenna array comprising two pairs of antenna elements,
   (1) said pairs of antenna elements being disposed at opposite sides of the reference plane, in a substantially symmetrical relation thereto, and
   (2) the two antenna elements of each pair being forwardly convergent relative to one another; and
B. said signal processing apparatus comprising
   (1) first directional angle output producing means connected with two of said antenna elements for producing, in response to radiation that is intercepted by said two antenna elements, a first directional angle output having a magnitude which signifies any of one set of directional angles, of which only one corresponds to the true directional angle to the source of the intercepted radiation,
   (2) second directional angle output producing means connected with the other two of said antenna elements for producing, in response to said radiation, a second directional angle output having a magnitude which signifies any of a second set of directional angles, of which only one corresponds to said true directional angle,
   (3) third output producing means connected with said first and second directional angle output producing means for producing a third output having a magnitude corresponding to a function of a comparison relationship between said first and said second directional angle outputs, and
   (4) comparison means connected with said first, said second and said third output producing means and comprising gating means, said comparison means being arranged to pass one of said directional angle outputs to said indicating means upon the condition that there is a predetermined relationship between said third output and at least the other of said directional angle outputs.

2. The receiving apparatus of claim 1, wherein the first mentioned two antenna elements comprise one of said pairs of antenna elements, and said other two antenna elements comprise the other of said pairs of antenna elements, further characterized by:
(a) said third output producing means comprising difference signal means connected with said first and second directional angle output producing means, for producing said third output with a magnitude corresponding to the difference between the magnitudes of the first and of the second directional angle outputs, and
(b) said comparison means being arranged to pass said one directional angle output to said indicating means upon the condition that there is a predetermined relationship between all three of said outputs.

3. The receiving apparatus of claim 1, further characterized by:
(5) a reference value generator for producing a reference value signal having a predetermined magnitude comparable with said magnitudes of said outputs,
(6) said comparison means comprising three comparison devices, one for each output producing means, each having
   (a) one input terminal connected with its output producing means,
   (b) another input terminal connected with said reference value generator, and
   (c) an output terminal connected with said gating means.

4. The receiving apparatus of claim 3, further characterized by:
(a) each of said comparison devices being a binary output device arranged to produce a gating output which is of one kind when the magnitude of the output from its output producing means has an absolute value greater than that of said predetermined magnitude of the reference value signal, but which is otherwise of different kind; and
(b) said gating means being arranged to pass said one directional angle output to said indicating means upon the condition that the gating outputs of said comparison devices are all of like kind.

5. The receiving apparatus of claim 4 wherein said reference value generator is adjustable for varying said magnitude of the reference value signal, further characterized by:
(a) said comparison means further comprising second gating means connected with said reference value generator, with each of said comparison devices and with the directional angle output producing means that produces the other of said directional angle outputs, said second gating means being arranged to pass said other directional angle output to said indicating means, to the exclusion of said one directional angle output, upon the condition that the magnitude of the reference value signal is other than said predetermined magnitude and has an absolute value greater than that of said other directional angle output.

6. Receiving apparatus responsive to electromagnetic radiations such as radar pulses, comprising an array of elongated end-firing log-periodic antenna elements defining a reference plane containing a sighting line, and signal processing apparatus connected with said array and comprising angle value indicating means, by which signals produced at the array by radiation emanating from a source that is forwardly remote from the array are processed to provide at said indicating means an indication of a directional angle between said sighting line and the projection upon said reference plane of a line through said array and said source, said receiving apparatus being characterized by:

A. said antenna array comprising two pairs of antenna elements,
  (1) said pairs of antenna elements being disposed at opposite sides of the reference plane, in a substantially symmetrical relation thereto,
  (2) the two antenna elements of each pair
    (a) being forwardly convergent relative to one another and
    (b) being lengthwise in symmetrical relationship to said sighting line, and
  (3) the two antenna elements of one pair being convergent at a lesser convergence angle than the two antenna elements of the other pair; and
B. said signal processing apparatus comprising
  (1) first difference signal means connected with said one pair of antenna elements, for producing in response to radiation from a source a first difference signal that has a magnitude which is a function of the directional angle,
  (2) second difference signal means connected with said other pair of antenna elements, for producing in response to said radiation a second difference signal having a magnitude which is a function of said directional angle,
  (3) third difference signal means connected with said first and second difference signal means for producing a third difference signal having a magnitude corresponding to the difference between said magnitudes of the first and second difference signals,
  (4) comparison means connected with each of said first, second and third difference signal means, for producing an output for each of said difference signals, which output is of one kind when the mangitude of the difference signal is greater than a predetermined reference value and is of another kind when the magnitude of the difference signal is less than said reference value, and
  (5) gating means responsive to the outputs of said comparison means and connected with said first difference signal means and with said indicating means, for passing said first difference signal to said indicating means when all of said outputs of the comparison means are of like kind and consequently the magnitude of said first difference signal has an unambiguous relationship to said directional angle.

7. The receiving apparatus of claim 6, further characterized by:
the angle of convergence of the antenna elements of said other pair being not more than twice the angle of convergence of the antenna elements of said one pair.

8. The receiving apparatus of claim 7 wherein the angle of convergence between the antenna elements of said other pair is substantially 1.5 times the angle of convergence between the antenna elements of said one pair.

9. The receiving apparatus of claim 6, further characterized by said signal processing apparatus further comprising:
  (6) an adjustable reference signal generator connected with said comparison means, for producing a reference signal which defines said predetermined reference value and which can be adjusted to other predetermined values; and
  (7) second gate means connected with said reference signal generator, with said comparison means and with said second difference signal means for passing said second difference signal to said indicating means when said reference signal is adjusted to one of said other predetermined values and the absolute value of the second difference signal is less than the prevailing absolute value of the reference signal.

10. The receiving apparatus of claim 1, further characterized by:
the antenna elements of one pair being at a different forwardly convergent angle to one another than the antenna elements of the other pair.

11. The receiving apparatus of claim 10, further characterized by:
the forwardly convergent angle between the antenna elements of said one pair being on the order of 1.5 times the forwardly convergent angle between the antenna elements of the other pair.

* * * * *